US012338861B2

(12) United States Patent
Baudu et al.

(10) Patent No.: US 12,338,861 B2
(45) Date of Patent: Jun. 24, 2025

(54) PLAIN BEARING OR ROLLING BEARING EQUIPPED WITH A SEALING DEVICE WITH A SEAL SEAT CLOSE TO THE AXIS OF REVOLUTION

(71) Applicant: NTN EUROPE, Annecy (FR)

(72) Inventors: Alexandre Baudu, Annecy (FR); Vincent Pourroy-Solari, Thônes (FR); Siegfried Ruhland, Annecy (FR)

(73) Assignee: NTN EUROPE, Annecy (FR)

( * ) Notice: Subject to any disclaimer, the term of this patent is extended or adjusted under 35 U.S.C. 154(b) by 0 days.

(21) Appl. No.: 18/262,742

(22) PCT Filed: Dec. 30, 2021

(86) PCT No.: PCT/EP2021/087876
§ 371 (c)(1),
(2) Date: Jul. 25, 2023

(87) PCT Pub. No.: WO2022/161734
PCT Pub. Date: Aug. 4, 2022

(65) Prior Publication Data
US 2024/0392835 A1 Nov. 28, 2024

(30) Foreign Application Priority Data
Jan. 29, 2021 (FR) ...................................... 2100908

(51) Int. Cl.
*F16C 33/80* (2006.01)
*B60B 27/00* (2006.01)
(Continued)

(52) U.S. Cl.
CPC ...... *F16C 33/7886* (2013.01); *B60B 27/0073* (2013.01); *F16C 33/7823* (2013.01);
(Continued)

(58) Field of Classification Search
CPC .. F16C 33/768; F16C 33/7823; F16C 33/783; F16C 33/7883; F16C 33/7886;
(Continued)

(56) References Cited

U.S. PATENT DOCUMENTS 9,377,055 B2      6/2016   Niebling et al.
2003/0016892 A1*  1/2003   Vignotto ............. F16C 33/7883
                                                            384/448

(Continued)

FOREIGN PATENT DOCUMENTS

| FR | 2000720 A1    | 9/1969 |
|----|---------------|--------|
| JP | 2008-138766 A | 6/2008 |
| WO | 2008/102579 A1| 8/2008 |

OTHER PUBLICATIONS

International Search Report and Written Opinion mailed Apr. 5, 2022, in connection with International Patent Application No. PCT/EP2021/087876, 12 pgs. (including translation).

*Primary Examiner* — Alan B Waits
(74) *Attorney, Agent, or Firm* — Chiesa Shahinian & Giantomasi PC

(57) ABSTRACT

A bearing includes an inner ring, an outer ring and a sealing device. The sealing device includes at least an outer structure secured to the outer ring, and an inner structure secured to the inner ring. The inner structure includes a shrink-fitting portion shrink-fitted onto a shrink-fitting bearing surface of the inner ring and at least one seal seat. The outer structure includes at least one seal lip in sliding contact against the seal seat. The seal seat is located axially at a distance from an end wall of the inner ring, and is closer to the axis of revolution than the shrink-fitting portion.

13 Claims, 3 Drawing Sheets

(51) Int. Cl.
  *F16C 33/78* (2006.01)
  *F16C 33/76* (2006.01)
  *F16C 41/00* (2006.01)

(52) U.S. Cl.
  CPC .......... *F16C 33/805* (2013.01); *F16C 33/768* (2013.01); *F16C 41/007* (2013.01); *F16C 2326/02* (2013.01)

(58) Field of Classification Search
  CPC ...... F16C 33/80; F16C 33/805; F16C 41/007; F16C 2326/02; B60B 27/0073
  See application file for complete search history.

(56) References Cited

U.S. PATENT DOCUMENTS

| | | | |
|---|---|---|---|
| 2011/0216993 A1* | 9/2011 | Mason | F16C 33/7813 |
| | | | 384/478 |
| 2020/0056652 A1* | 2/2020 | Krapf | F16C 33/7886 |
| 2021/0372476 A1* | 12/2021 | Kim | B60B 27/0073 |

* cited by examiner

PLAIN BEARING OR ROLLING BEARING EQUIPPED WITH A SEALING DEVICE WITH A SEAL SEAT CLOSE TO THE AXIS OF REVOLUTION

CROSS-REFERENCE TO RELATED APPLICATION(S)

This application is a National Stage under 35 U.S.C. 371 of International Patent Application No. PCT/EP2021/087876, filed Dec. 30, 2021, which claims the benefit of priority under 35 U.S.C. 119 to French Patent Application No. 2100908, filed Jan. 29, 2021; the disclosures of all of which are incorporated herein by reference in their entirety.

TECHNICAL FIELD OF THE INVENTION

The invention relates to a plain bearing or rolling bearing, and in particular, although not exclusively, to such a bearing constituting a rolling bearing for a motor vehicle wheel, preferably a rolling bearing for a drive and steering wheel.

STATE OF THE PRIOR ART

The electric or hybrid drivetrains of certain motor vehicles reduce the space available for positioning the transmission bowl of the drive wheels, and have led to the proposal of assemblies in which at least part of the rotational guidance of the wheels overlaps with the transmission bowl, of the type described for example in French application FR2000720, unpublished to date. Such assemblies require larger-diameter wheel bearings than those normally found on the market. To guarantee the sealing of such bearings, it is necessary to provide seals. For this purpose, a cassette seal can naturally be considered, housed in a space located radially directly between the inner and outer ring. However, such a large-diameter seal poses problems that are difficult to solve without increasing the cost of the function. In particular, the seal generates friction between the seal lip and the seat, and this friction increases with diameter, which has a negative impact on resistive torque and operating temperature. On the other hand, a large-diameter joint requires additional assembly precision and reduced manufacturing tolerances. Finally, inserting a cassette seal into the wheel bearing requires two cylindrical seats facing each other on the outer ring and inner ring.

Document U.S. Pat. No. 9,377,055 B2 illustrates a wheel bearing equipped with a sealing device composed of a conventional cassette seal protected by a chicane seal, comprising an outer structure secured to an outer ring of the bearing and positioned opposite an inner structure secured to an inner ring of the bearing, the two inner and outer structures being without contact with one another. Here again, inserting a cassette seal into the wheel bearing requires two cylindrical bearing surfaces facing one another on the outer ring and the inner ring.

Document JP2008138766, which serves as a basis for the preamble of claim 1, describes a wheel bearing, equipped with a sealing device comprising an outer structure secured to an outer ring of the bearing and an inner structure secured to an inner ring of the bearing, the outer structure and the inner structure together delimiting a sealing volume, the inner structure comprising a shrink-fitting portion shrink-fitted onto the shrink-fitting bearing surface of the inner ring and at least one seal seat, the outer structure comprising at least one seal lip in sliding contact against the seal seat, in order to seal the sealing volume. The seal seat is planar and extends in the direction of the axis of revolution so as to cover part of the axial end face of the inner ring. In such a device, the seal and the seal seat are directly exposed to pollutants. The seal seat, which rotates with the inner ring, centrifuges the pollutants and contributes to spraying them in the direction of the seal, which is not favorable.

Document WO 2008/102 579 A1 describes a wheel bearing, equipped with a sealing device comprising an outer structure secured to an outer ring of the bearing and an inner structure secured to the inner ring of the bearing, the outer structure and the inner structure together delimiting a sealing volume open on an inner volume of the bearing. The inner structure comprises a shrink-fitting portion shrink-fitted onto a shrink-fitting bearing surface of the inner ring and at least one seal seat. The outer structure comprises at least one seal lip in sliding contact against the seal seat so as to seal the sealing volume. The seal seat comprises a cylindrical part turned radially outwards and which covers the shrink-fitting portion, and a planar portion that extends from the cylindrical part in the direction opposite the axis of revolution. The structure obtained comprises a large number of parts and a complex assembly. In addition, it is not suitable for large-diameter wheel bearings, since the seal seat is located radially outside the shrink-fitting bearing surface of the inner structure.

DISCLOSURE OF THE INVENTION

The aim of the invention is to remedy the disadvantages of the prior art and to offer a plain bearing or rolling bearing which reconciles a large pitch diameter and a satisfactory sealing function from the perspective of technical performance and financial cost.

To do this, proposed according to a first aspect of the invention is a plain bearing or rolling bearing comprising at least an inner ring and at least an outer ring, the inner ring and the outer ring being able to rotate relative to one another about an axis of revolution of the bearing, the inner ring having a guide race, the outer ring having at least a guide race located opposite the guide race of the inner ring and delimiting with the guide race of the inner ring an inner volume of the bearing, the inner ring having an axial end face turned in a reference axial direction parallel to the axis of revolution, the axial end face being located axially at a distance from the guide race of the inner ring in the reference direction, the inner ring having a shrink-fitting bearing surface located axially between the axial end face and the guide race of the inner ring, the bearing comprising a sealing device, the sealing device comprising at least an outer structure secured to the outer ring and an inner structure secured to the inner ring, the outer structure and the inner structure together delimiting a sealing volume open onto the inner volume of the bearing, the inner structure comprising a shrink-fitting portion shrink-fitted onto the shrink-fitting bearing surface of the inner ring and at least a seal seat, the outer structure comprising at least a seal lip in sliding contact with the seal seat, the seal seat and the seal lip sealing the sealing volume, characterized in that the seal seat is located axially at a distance from the end wall of the inner ring in the reference axial direction, and is closer to the axis of revolution than the shrink-fitting bearing surface.

According to the invention, the seal seat faces radially away from the axis of revolution of the bearing. The inner structure further comprises a connecting portion protruding axially relative to the seal seat in the reference direction, and a deflector, protruding radially from the matching portion in a radial direction facing away from the axis of revolution.

The deflector forms, with the outer structure, a chicane passage opening into the sealing volume, the chicane passage having an inlet farther from the axis of revolution than the seal seat, the seal seat and the seal lip being positioned in the sealing volume and interposed between the chicane passage and the inner volume of the bearing. The geometry of the chicane passage promotes a centrifuging of the pollutants that can penetrate therein.

By placing the seal seat outside the inner ring, the diameter and circumference of the seal seat can be reduced, and the friction torque between the seal lip and the seal seat is reduced, which is particularly advantageous for a high pitch diameter bearing.

Preferably, the seal seat is closer to the axis of revolution than a bottom of the guide race of the inner ring.

According to one embodiment, the cylindrical shrink-fitting bearing surface of the inner ring faces radially away from the axis of revolution of the bearing.

According to one embodiment, the inner structure comprises a frame forming the shrink-fitting portion and the seal seat.

Preferably, the deflector is attached to the frame by fastening, shrink-fitting, bonding, by fastening elements or any other means.

According to one embodiment, the inner structure comprises a static sealing portion bearing against a static seal intended to be interposed between the inner structure and a part secured to the inner ring, in particular a transmission bowl or a bellows for protecting a transmission bowl. The static seal makes it possible to protect the connection between the inner ring and the part on which it is mounted.

According to one embodiment, the inner structure comprises an encoder. The encoder makes it possible to encode information, in particular position information, read by a sensor, which is preferably stationary relative to the outer structure.

According to one embodiment, the guide race of the outer ring is a raceway, the guide race of the inner ring is a raceway, the bearing being a rolling bearing comprising at least one row of rolling bodies able to roll on the raceway of the outer ring and the raceway of the inner ring so as to allow relative movement of rotation between the inner ring and the outer ring around the axis of revolution. In this context, the invention makes it possible to increase the pitch diameter of the rolling bearing without negatively impacting the resisting torque of the rolling bearing. Preferably, the seal seat is closer to the axis of revolution than the pitch circle defined by the row of rolling elements. By thus reducing the circumference of the seal seat, the friction torque of the bearing is reduced.

According to another aspect of the invention, it relates to a motor vehicle wheel support device, characterized in that it comprises a bearing according to any one of the preceding claims, the inner ring being a rotating ring, preferably a wheel hub or a ring secured to a wheel hub, and the outer ring is a fixed ring having an interface for attachment to a wheel support, in particular a wheel pivot.

BRIEF DESCRIPTION OF THE FIGURES

Other features and advantages of the invention will become apparent on reading the following description, with reference to the appended figures, which show.

For greater clarity, identical or similar elements are identified by identical reference signs in all of the figures.

DETAILED DESCRIPTION OF EMBODIMENTS

Figure 1:
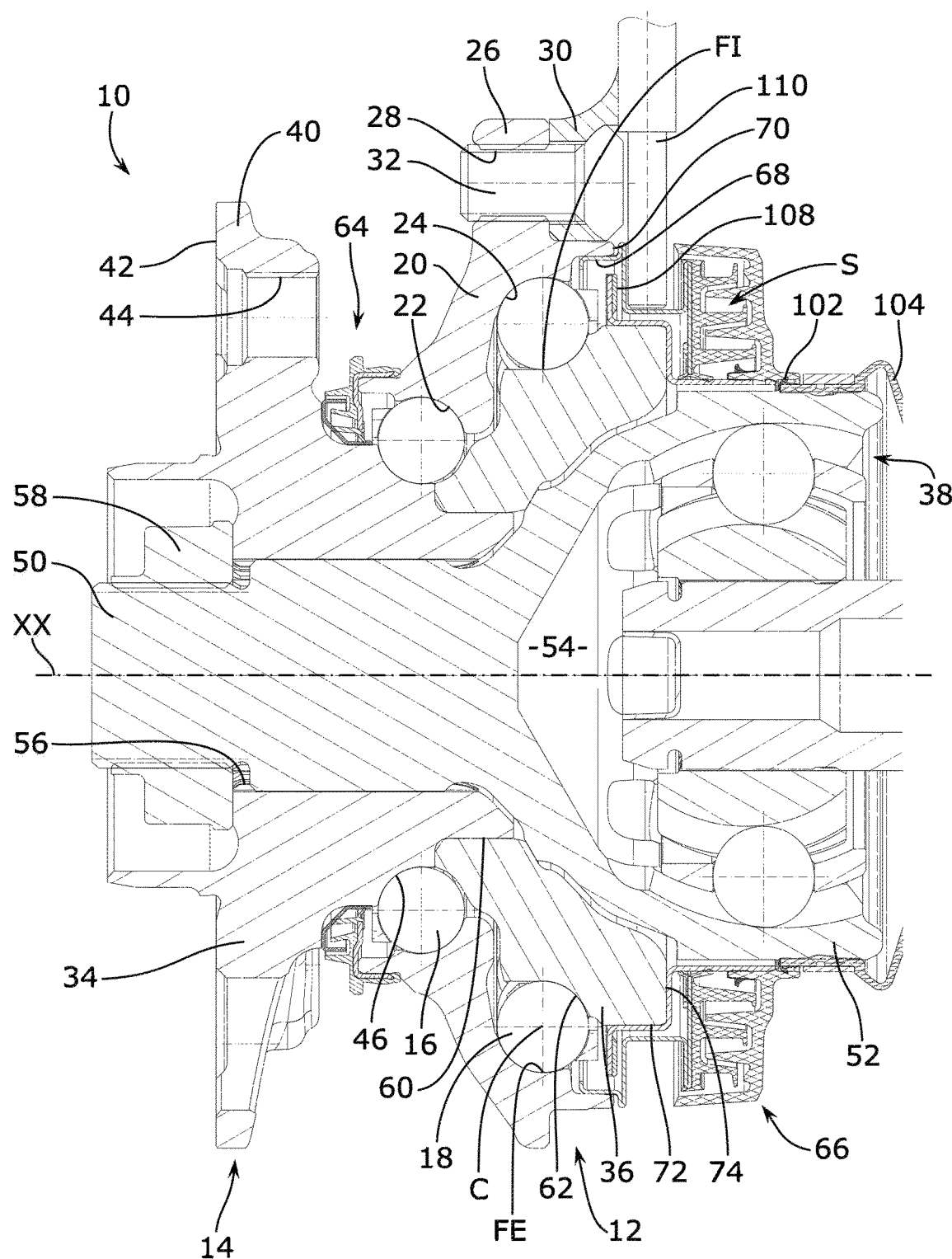
FIG. 1: an axial cross-sectional view of a wheel support assembly comprising a wheel bearing according to a first embodiment of the invention.

FIG. 1 shows a motor vehicle drive wheel assembly 10, comprising a fixed subassembly 12, intended to be secured to a suspension member of a motor vehicle (not shown) and defining an axis of rotation XX, a rotating subassembly 14, capable of rotating about the axis of rotation XX inside the fixed subassembly 12, and guiding rolling bodies 16, 18 between the rotating subassembly 14 and the fixed subassembly 12.

The fixed sub-assembly 12 is here constituted by a single-piece solid metal outer ring 20 on which are formed in this embodiment two coaxial outer raceways 22, 24 defining the axis of revolution XX, one of the outer raceways 22 being intended to be positioned on an outer side of the vehicle, and the other 24 being intended to be positioned on an inner side of the vehicle, i.e. closer to a median longitudinal vertical plane of the vehicle. The outer ring further comprises at least one attachment clamp 26 extending radially outward, in which bores 28 are formed for attaching the attachment clamp 26 to a suspension member 30, in this case a strut pivot, via attachment elements 32.

The rotating sub-assembly 14 comprises a wheel hub 34, which forms an inner ring on the outside of the vehicle, a second inner ring 36 on the inside of the vehicle and a transmission bowl 38.

The wheel hub 34 is a solid single-piece metal part, which comprises a flange 40 for attaching a drive wheel rim and a brake disc. The flange 40 has a flat face 42 bearing the brake disc or wheel rim, and is provided with attachment bores 44, allowing the insertion of attachment elements of the rim and/or of the brake disc. The wheel hub 34 has a first inner raceway 46 facing the first outer raceway 22.

The transmission bowl 38 is a solid one-piece metal part, which, in this embodiment, has a solid protruding end portion 50 and a flared middle portion 52 delimiting a cavity 54, acting as a constant-velocity joint. The protruding portion 50 of the transmission bowl 38 is splined and mounted free, fitted or shrunk in a splined tubular cavity 56 of the wheel hub 34, forming a splined contact interface. Furthermore, FIG. 1 shows means for attaching the transmission bowl 38 and the wheel hub 34, which implement a nut 58 screwed to a threaded end of the protruding portion 50, and bearing against a shoulder of the wheel hub 34. The inner bearing ring 36 on the inside of the vehicle is shrunk onto a cylindrical shrink-fit surface 60 of the wheel hub 34 and clamped in the axial direction between the wheel hub 34 and the transmission bowl 38.

An inner raceway 62 is formed on the inner rolling bearing ring 36 opposite the outer raceway 24 on the inside of the vehicle. The rolling bodies 16, 18 form, on the one hand, a first row of rolling bodies 16 that roll on the outer raceway 22 and the inner raceway 46 on the outside of the vehicle and, on the other hand, a second row of rolling bodies 18 that roll on the outer raceway 24 and the inner raceway 62 on the inside of the vehicle.

These two rows of rolling bodies 16, 18 and raceways 22, 24, 46, 62 are protected by two sealing devices, namely a sealing device 64 located on the outside of the vehicle, positioned between the outer ring 20 and the wheel hub 34, and a sealing device 66 located on the inside of the vehicle, positioned between the outer ring 20 and the inner rolling ring 36.

The components of the wheel bearing 10 described so far are generic, and can be presented in many variants. In particular, the inner raceway 46 can be formed on a bearing ring attached to the wheel hub 34. The inner ring 36 on the inside of the vehicle can be secured to the wheel hub 34 by a snap ring and, if necessary, have no contact with the transmission bowl 38. The transmission bowl 38 can be attached to the wheel hub 34 by any means. The bearing may comprise just one row of rolling elements 16, which may be balls or rollers.

Figure 2:
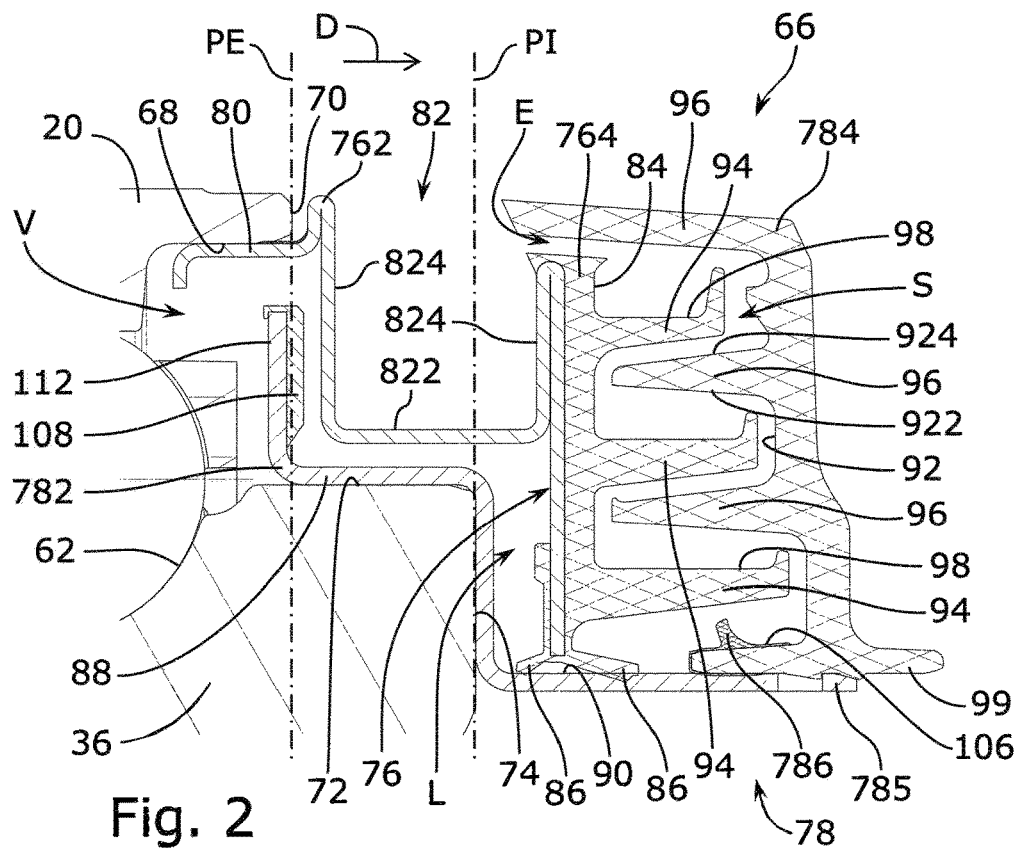
FIG. 2: a detailed view of certain components of the wheel bearing of FIG. 1.

We'll now take a closer look at the sealing device 66 located on the inside of the vehicle, shown in detail in FIG. 2, which seals the outer bearing ring 20 and the inner bearing ring 36, and more specifically protects a volume V located between the raceway 24 of the outer ring 20 and the raceway 62 of the inner ring 36. In this region, the outer bearing ring 20 has a shrink-fit surface 68, which is cylindrical here and faces the axis of revolution XX, and an end wall 70, which makes it possible to define a reference plane PE of the bearing outer ring 20, perpendicular to the axis of revolution XX and tangent to the end face 70. The shrink-fit surface 68 extends axially and circumferentially in a region of the outer ring 20 located between the raceway 24 on the inside of the vehicle and the end face 70. The shrink-fit surface 68 on the outer ring is further away from the axis of revolution XX than a pitch circle C of the row of rolling elements 18, and, in this embodiment, further away from the axis of revolution XX than a raceway bottom FE of the raceway 24 of the outer ring 20.

The inner bearing ring 36 also has a shrink-fit face 72, which in this case is cylindrical and faces radially outwards, and an end wall 74, which defines a reference plane PI of the inner bearing ring 36, perpendicular to the axis of revolution XX and tangent to the end face 74. The shrink-fit surface 72 extends axially and circumferentially in an region of the inner ring located between the raceway 62 on the inside of the vehicle and the end face 74. The end face 74 of the inner bearing ring and the end face 70 of the outer bearing ring are rotated in a common direction D parallel to the reference axis XX, which will be an axial reference direction for the remainder of the presentation. In this embodiment, it may be noted that the reference plane PI of the inner bearing ring 36 is located at a distance from the reference plane PE of the outer bearing ring 20 and offset in the axial reference direction D, so that the inner bearing ring 36 protrudes from the outer bearing ring 20 in the axial reference direction D, and passes through the reference plane PE of the outer bearing ring 20. More specifically, at least part of the shrink-fit surface 72 of the inner bearing ring 36 is located on one side of the reference plane PE of the outer bearing ring 20 opposite the shrink-fit surface 68 of the outer bearing ring 20.

The sealing device 66 comprises an outer structure 76 integral with the outer ring 20, and an inner structure 78 integral with the inner ring 36.

The outer structure 76 comprises a shrink-fitting portion 80 shrunk onto the shrink-fit surface 68 of the outer ring 20, and a functional portion forming a gutter 82 open radially outwards, a chicane wall 84 and, in this embodiment, two sealing lips 86. The gutter 82 has a bottom 822 and side walls 824, which are located axially on either side of the bottom and are further from the axis of revolution than the bottom. In this embodiment, the outer structure 76 includes a rigid frame 762, for example made of sheet metal or plastic, and an overmold 764. The frame 762 forms the shrink-fitting portion 80 and gutter 82, while the overmolding 764 forms the chicane wall 84 and seal lips 86.

The inner structure 78 includes a shrink-fitting portion 88 shrink-fitted onto the shrink-fit bearing surface 72 of the inner ring 36, and a functional portion forming a seal seat 90 and a chicane wall 92 located opposite the chicane wall 84 of the outer structure 76 in order to delimit a chicane passage S between the inner structure 78 and the outer structure 76. The seal lips 86 are elastically deformable and bear on the seal seat 90, which is cylindrical in this embodiment. The inner structure 78 and the outer structure 76 of the sealing device together delimit an annular housing L for the seal seat 90 and the seal lips 86, wherein the chicane passage S opens and which communicates with the internal volume V delimited by the raceway 24 of the outer bearing ring 20 and by the raceway 62 of the inner bearing ring 36.

The shrink-fitting portion 88 and the functional portion of the inner structure 78 lie on either side of the reference plane PI of the inner ring 36. This makes it possible to position the seal seat 90 closer to the axis of revolution XX than the shrink-fitting portion 88. This arrangement is designed to minimize the diameter of the seal seat 90, thereby making it possible to minimize the frictional torque between the seal lips 86 and the seal seat 90, and to reduce the heat generated by this friction.

The chicane passage S has an inlet E delimited by an inlet portion of the chicane wall 84 of the outer structure 76 and by an inlet portion of the chicane wall 92 of the inner structure 78. The inlet E of the chicane passage S and the shrink-fitting portion 80 of the outer structure 76 are located axially on either side of the gutter 82. The chicane passage S and the gutter 82 are located on the same side of the reference plane PE of the outer ring 20, opposite the side of the reference plane PE on which the shrink-fitting portion 80 of the outer structure 76 is located. The inlet of the chicane passage is further from the axis of revolution XX than the seal seat 90.

The chicane wall 84 of the outer structure 76 is formed by annular ribs 94 which project axially towards the chicane wall 92 of the inner structure 78. Similarly, the chicane wall 92 of the inner structure 78 is formed by several annular ribs 96, which project axially towards the chicane wall 84 of the outer structure 76 and are interposed in interspaces between the annular ribs 94 of the outer structure 76. The annular ribs 94 of the outer structure 76 form one or more additional gutters 98 located inside the chicane passage S. At the annular ribs 96 of the inner structure 78, the chicane wall 92 includes frustoconical facets 922 turned toward the axis of revolution and frustoconical walls 924 turned radially outward.

The inlet E of the chicane passage S is annular and faces in an axial direction opposite the reference axial direction D, towards the outer bearing ring 20. The inlet E is further from the axis of revolution XX than the bottom 822 of the gutter 82. In this case, the inlet E is preferably further from the axis of revolution XX than the pitch circle C defined by the row of rolling elements 18.

The inlet portion of the chicane wall 92 of the inner structure 78 is preferably frustoconical as shown, so as to converge towards an apex further from the outer ring reference plane PE than the inlet E. Similarly, the inlet portion of the chicane wall 84 of the outer structure 76 is preferably frustoconical as shown in the figures, so as to converge towards an apex further from the outer ring reference plane PE than the inlet E.

In this embodiment, it can be seen that the gutter 82 at least partially overlaps axially with the shrink-fitted surface 72 of the bearing inner ring 36 and with the shrink-fitting portion 88 of the inner structure 78. The chicane wall 84 of the outer structure 76 is located entirely on one side of the reference plane PI of the inner bearing ring 36, and entirely on one side of the gutter 82, so that the gutter 82 is located axially between the shrink-fitting portion 80 of the outer structure 76 and the chicane wall 84 of the outer structure 76.

Optionally, the functional portion of the inner structure 78 can also form a seat 99 or a support for a static seal 102 cooperating directly or indirectly with a flared median portion 52 of the transmission bowl 38 and/or an interface for attaching a protective sleeve 104 of the transmission bowl 38.

Figure 3:
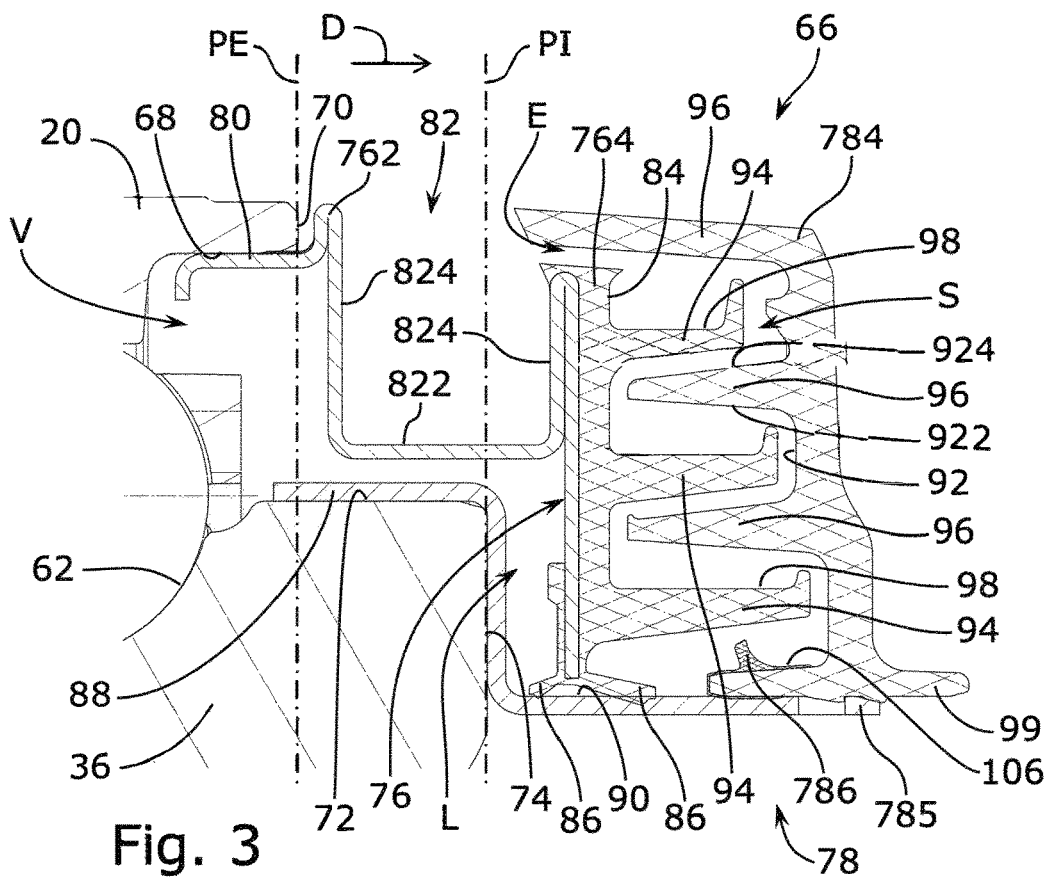
FIG. 3: a detailed view of certain components of a wheel bearing according to a second embodiment of the invention.

The inner structure 78 of the sealing device 66 includes a frame 782, preferably metal, which forms the shrink-fitting portion 72 and may also form the seal seat 90. Alternatively, the seal seat 90 can be formed on an annular part attached to the frame 782, which frame 782 may or may not be made of a non-metallic material. Preferably, the inner structure 78 further comprises a second part 784 attached to a connection portion 785 of the frame 782 by any suitable means, in particular by bonding, overmolding or mechanical fastening, for example by shrink-fitting or by fastening elements, or, as shown in FIGS. 1 to 3, by elastic fastening. The connecting portion 785 of frame 782 here projects axially from seal seat 90 in reference direction D. The second part 784 may be made of plastic. It acts as a deflector, forming the chicane wall 92 of the inner structure and, where appropriate, the seat 99 or the support for static seal 102, or even the static seal 102 itself. In the embodiment shown in FIGS. 1 and 2, a third part 786, together with the second part 784, defines an additional gutter 106 close to the seal seat 90.

According to a variant not shown, the part forming the deflector can also form the seal seat.

In the embodiment shown in FIGS. 1 and 2, the inner structure 78 also supports a preferably annular encoder 108, positioned opposite a side wall 824 or the bottom 822 of the gutter 82, and which may in particular be a multipolar magnetic encoder or a phonic wheel. With a sensor 110 penetrating locally into the gutter 82, data, in particular position data, encoded on the encoder 108 can be read remotely through the wall 824 of the gutter 82. The reading can be radial if the encoder 108 is positioned on the shrink-fitting portion 88 of the inner structure 78, and if the shrink-fit is controlled so as not to induce uncontrolled deformation of the encoder 108. Alternatively, and preferably, reading is axial, as shown in FIGS. 1 and 2, in which case the encoder 108 is supported by a flat annular flange 112 projecting radially from the shrink-fitting portion 88 towards the outer bearing ring 20. It should be noted that even in the absence of an encoder 108, the flat annular flange 112, positioned opposite and at a short distance from the side wall 824, can be advantageous, in that it enables grease to be confined within the volume V, allowing, if necessary, one of the seal lips 86 to be eliminated and thus contributing to a reduction in friction torque.

FIG. 3 shows a variant of the sealing device 66 that differs from the embodiment shown in FIGS. 1 and 2 in that no encoder is used.

Figure 4:
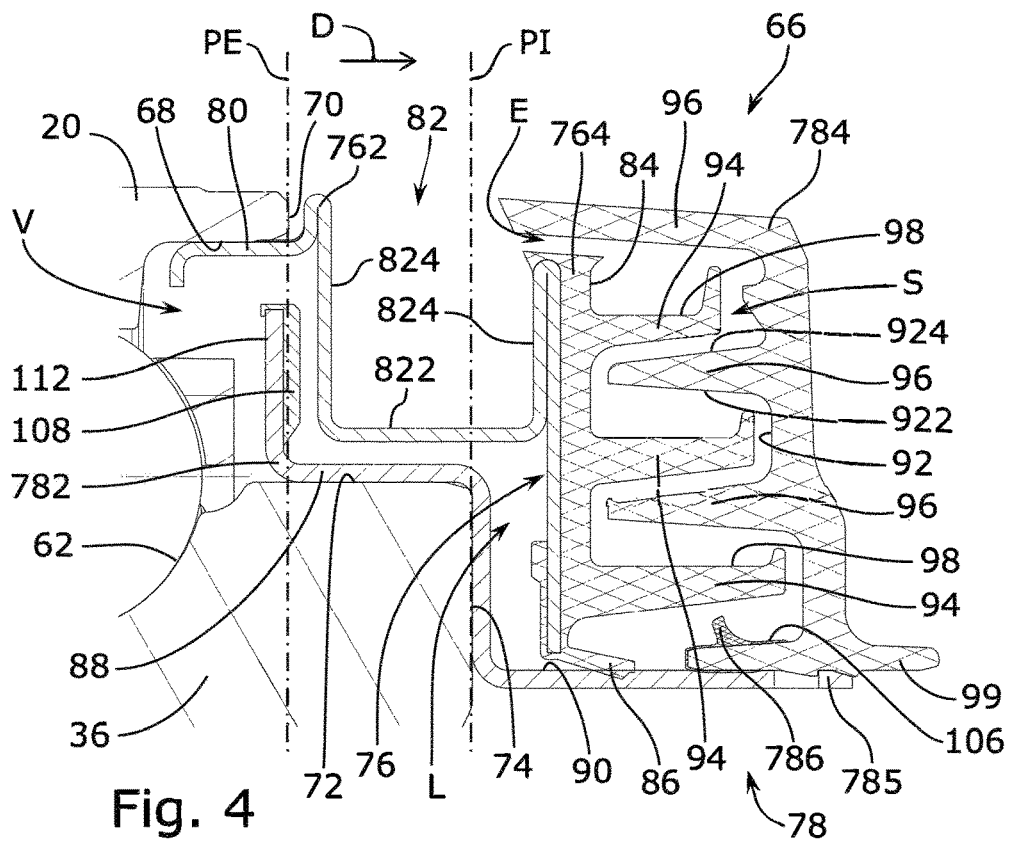
FIG. 4: a detailed view of certain components of a wheel bearing according to a third embodiment of the invention.

FIG. 4 shows a further variant, which differs from the embodiment shown in FIGS. 1 and 2 in the shape of the seal, which has only one seal lip 86.

Figure 5:
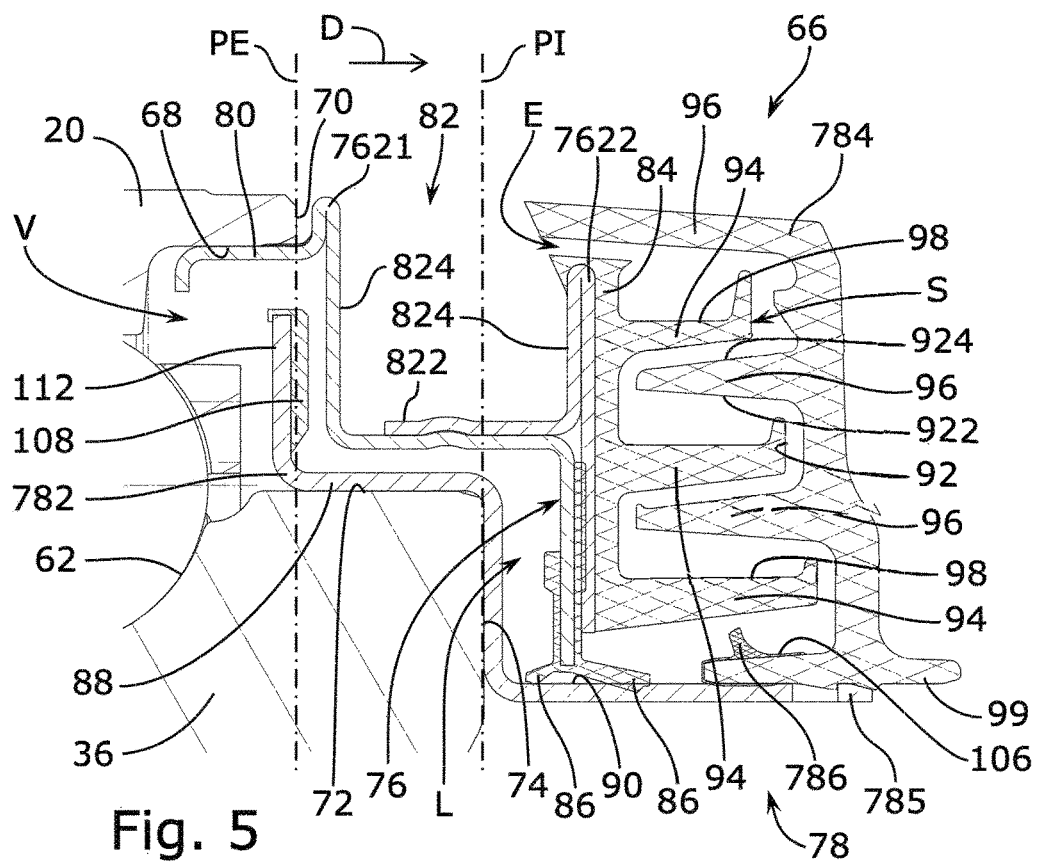
FIG. 5: a detailed view of certain components of a wheel bearing according to a fourth embodiment of the invention.

FIG. 5 shows another variant, which differs from the embodiment shown in FIGS. 1 and 2 in that the frame 762 of the outer structure 76 of the sealing device consists of two parts 7621, 7622 fastened together by any suitable means, in this case by shrink-fitting and mechanical interlocking.

According to a variant not shown, the seal seat can have a flat annular face parallel to the reference plane of the inner ring, the outer structure of the sealing device then comprising a seal lip bearing axially against this flat face.

The examples shown in the figures and discussed above are provided for illustrative purposes only. It is explicitly provided that it is possible to combine the various illustrated embodiments in order to provide others. The sealing device described can be used in applications other than the protection of a wheel bearing, and will advantageously be applicable to any plain bearing or rolling bearing, and in particular to any plain bearing or rolling bearing whose outer ring is intended to be fixed and the inner ring is intended to rotate. In this more general context, the raceways 22, 24, 46, 62 will be referred to as guide races.

It is emphasized that all of the features, as they are taught to the person skilled in the art from the present disclosure, drawings and attached claims, even though specifically they have been described in relation to other specific features, both individually and in any combinations, may be combined with other features or feature groups disclosed herein, as long as not expressly excluded and no technical circumstances make such combinations impossible or nonsensical.

The invention claimed is:

1. A bearing comprising:
at least one inner ring; and
at least one outer ring, the inner ring and the outer ring being able to rotate relative to one another about an axis of revolution of the bearing, the inner ring having a guide race, the outer ring having at least one guide race located opposite the guide race of the inner ring and delimiting with the guide race of the inner ring an inner volume of the bearing, the inner ring having an axial end face facing a reference axial direction parallel to the axis of revolution, the axial end face being located axially at a distance from the guide race of the inner ring in the reference direction, the inner ring having a shrink-fitting bearing surface located axially between the axial end face and the guide race of the inner ring, the bearing including a sealing device, the sealing device including at least an outer structure secured to the outer ring and an inner structure secured to the inner ring, the outer structure and the inner structure together delimiting a sealing volume open to the inner volume of the bearing, the inner structure including a shrink-fitted portion shrink fitted onto the shrink-fitting bearing surface of the inner ring and at least one seal seat, the outer structure including at least one seal lip in sliding contact against the seal seat, the seal seat and the seal lip sealing the sealing volume, the seal seat being located axially at a distance from the axial end face of the inner ring in the reference axial direction, and being closer to the axis of revolution than the shrink-fitting bearing surface, wherein
the seal seat faces radially away from the axis of revolution of the bearing,
the inner structure further includes a connecting portion protruding axially relative to the seal seat in the reference direction, and a deflector protruding radially from the connecting portion in a radial direction facing away from the axis of revolution, and the deflector forms with the outer structure a chicane passage opening into the sealing volume, the chicane passage having an inlet further from the axis of revolution than the seal seat, the seal seat and the seal lip being positioned in the sealing volume and interposed between the chicane passage and the inner volume of the bearing.

2. The bearing of claim 1, wherein the seal seat is closer to the axis of revolution than a bottom of the guide race of the inner ring.

3. The bearing of claim 1, wherein the shrink-fitting bearing surface of the inner ring faces radially away from the axis of revolution of the bearing.

4. The bearing of claim 1, wherein the outer structure includes a frame, forming the shrink-fitting portion and the seal seat.

5. The bearing of claim 4, wherein the deflector is attached to the frame by fastening, shrink-fitting, bonding, or by fastening elements.

6. The bearing of claim 1, wherein the inner structure includes a static sealing portion bearing against a static seal configured to be interposed between the inner structure and a part secured to the inner ring.

7. The bearing of claim 6, wherein the part secured to the inner ring is a transmission bowl or a bellows protecting a transmission bowl.

8. The bearing of claim 1, wherein the inner structure includes an encoder.

9. The bearing of claim 1, wherein the guide race of the outer ring is a raceway, the guide race of the inner ring is a raceway, the bearing being a rolling bearing including at least one row of rolling bodies able to roll on the raceway of the outer ring and the raceway of the inner ring so as to allow relative movement of rotation between the inner ring and the outer ring about the axis of revolution.

10. The bearing of claim 9, wherein the seal seat is closer to the axis of revolution than a pitch circle defined by the row of rolling bodies.

11. A motor vehicle wheel support device, comprising a bearing, the bearing comprising at least one inner ring and at least one outer ring, the inner ring and the outer ring being able to rotate relative to one another about an axis of revolution of the bearing, the inner ring having a guide race, the outer ring having at least one guide race located opposite the guide race of the inner ring and delimiting with the guide race of the inner ring an inner volume of the bearing, the inner ring having an axial end face facing a reference axial direction parallel to the axis of revolution, the axial end face being located axially at a distance from the guide race of the inner ring in the reference direction, the inner ring having a shrink-fitting bearing surface located axially between the axial end face and the guide race of the inner ring, the bearing including a sealing device, the sealing device including at least an outer structure secured to the outer ring and an inner structure secured to the inner ring, the outer structure and the inner structure together delimiting a sealing volume open to the inner volume of the bearing, the inner structure including a shrink-fitted portion shrink fitted onto the shrink-fitting bearing surface of the inner ring and at least one seal seat, the outer structure including at least one seal lip in sliding contact against the seal seat, the seal seat and the seal lip sealing the sealing volume, the seal seat being located axially at a distance from the axial end face of the inner ring in the reference axial direction, and being closer to the axis of revolution than the shrink-fitting bearing surface, wherein the seal seat faces radially away from the axis of revolution of the bearing;

the inner structure further includes a connecting portion protruding axially relative to the seal seat in the reference direction, and a deflector protruding radially from the connecting portion in a radial direction facing away from the axis of revolution; and the deflector forms with the outer structure a chicane passage opening into the sealing volume, the chicane passage having an inlet further from the axis of revolution than the seal seat, the seal seat and the seal lip being positioned in the sealing volume and interposed between the chicane passage and the inner volume of the bearing, wherein, the inner ring is a rotating ring, and the outer ring is a fixed ring having an interface for fastening to a wheel support.

12. The motor vehicle wheel support device of claim 11, wherein the rotating ring is a wheel hub or a ring secured to a rotating wheel hub.

13. The motor vehicle wheel support device of claim 11, wherein the wheel support is a wheel pivot.

* * * * *